United States Patent [19]

Slocumb

[11] 4,089,818

[45] May 16, 1978

[54] REDUCED AGING PERIOD FOR POLYETHYLENE FOAM

[75] Inventor: Robert C. Slocumb, New Brighton, Minn.

[73] Assignee: Conwed Corporation, St. Paul, Minn.

[21] Appl. No.: 716,250

[22] Filed: Aug. 20, 1976

[51] Int. Cl.² .............................................. C08J 9/14
[52] U.S. Cl. ......................... 260/2.5 HA; 260/2.5 E; 260/897 A
[58] Field of Search .......... 260/897 A, 2.5 HA, 2.5 E

[56] References Cited

U.S. PATENT DOCUMENTS

| 3,098,831 | 7/1963 | Carr | 260/2.5 HA |
| 3,651,183 | 3/1972 | Hosoda et al. | 260/2.5 HA |

FOREIGN PATENT DOCUMENTS

| 762,592 | 11/1956 | United Kingdom | 260/897 A |

Primary Examiner—Morton Foelak
Attorney, Agent, or Firm—Eyre, Mann, Lucas & Just

[57] ABSTRACT

In accordance with the present invention the aging period for low density polyethylene foam is substantially reduced by forming the foam from at least two different resins having different melt indexes which are blended together.

10 Claims, No Drawings

REDUCED AGING PERIOD FOR POLYETHYLENE FOAM

The present invention relates to a method for reducing the aging period of low density polyethylene foam.

The production of low density polyethylene foam is quite well known in the art. It is normally formed by injecting under pressure a blowing agent, typically a volatile hydrocarbon such as a halogenated hydrocarbon, into molten polyethylene whereafter the mixture is extruded to ambient temperature. As the molten polyethylene is extruded to ambient temperature, foaming of the polyethylene mass takes place.

Due to the migration of the blowing agent through the cell walls of the foam, the foam will usually shrink within about 24 hours. This shrinkage will typically be in the range of 40% to 80% of the original foam volume depending upon the original foam density of the extruded material. If the thus shrunk foam is permitted to age, i.e., not used but rather stored in a room where air is available, after a period of time, the foam will recover approximately 90% to 95% of its original volume. Unfortunately, it normally takes a minimum of at least 2 weeks and can take up to 6 weeks for the foam to properly age. It is quite apparent that this involves a substantial investment in terms of storage space, work in progress and the like. Obviously any method which will reduce the aging period is highly desirable.

It has been found that the aging period for extruded low density polyethylene resins having different melt indexes are blended to form the polyethylene melt. While the exact mechanism by which the aging period is reduced is not completely known, it is believed that the blend of resins retards the migration of the blowing agent through the cell wall to a rate which approximately matches the rate of air diffusing into the cell. No matter what the exact mechanism is, it has been found that when the thermoplastic melt comprises a plurality of low density polyethylene resins with different melt indexes and with an overall melt index of relatively low minimum value, all as specified hereinafter, the aging period will be reduced to a maximum time of about 1 week.

It is important to note that the present invention is directed to low density polyethylene resins and by this it is meant those polyethylene resins having densities of from about 0.910 to about 0.926. While other thermoplastic resins such as high density polyethylene, polypropylene, polyacrylates and the like may also be included in a minor amount, the predominant portion of the thermoplastic melt is low density polyethylene. The resin portion of the thermoplastic melt is at least about 85% low density polyethylene, more preferably above 95% and best results have been achieved when substantially all (i.e., about 100% polyethylene with only trace amounts of other resins) of the resin portion of the thermoplastic melt is low density polyethylene resins.

The thermoplastic melt of the present invention comprises the following:

(a) at least 25% by weight of a polyethylene resin having a melt index in the range of from about 0.1 to about 1.0;

(b) at least 25% by weight of a polyethylene resin having a melt index of from about 1.0 to about 10.0;

(c) the melt index of the second said resin being at least about 1.0 greater than the melt index of the first said resin;

(d) each said polyethylene resin (a) and (b) having a density of from about 0.910 to about 0.926;

(e) at least about 85% by weight of the total resin in the melt being low density polyethylene resin of density from about 0.910 to about 0.926;

(f) the overall melt index of the thermoplastic melt being no greater than about 8.

Thus it will be appreciated that more than two resins can be employed provided there are at least two resins each of which is present in the amount of 25% by weight and each of which has the requisite density and the melt indexes of the two resins differing by at least about 1.0. In fact, a third polyethylene resin could be employed having a high melt index, e.g. 50 or greater, so long as the overall melt index of the thermoplastic melt is still maintained within the limits set. It is preferred that the melt indexes of the two resins differ by at least 2.0 and best results have been obtained when the melt indexes of the two resins differ by at least 2.5.

The foams of the present invention are low density foams and have a maximum density of about 10 pounds per cubic foot (PFC). It is preferred that the foam formed have a density of from about 1 to about 6 PCF and it is most preferred that the foam have a density of from about 2 to about 4 PCF.

These and other aspects of the present invention may be more fully understood from the following examples. In each of the following examples, an extrusion temperature of approximately 230° F. was employed. Each of the polyethylene resins used in each example had a density of between 0.910 and 0.926 except where otherwise noted. Furthermore, in each example 17 parts of a fluorocarbon blowing agent were employed and 0.01 parts azo bis formamide as a nucleating agent were used. The extrusion was carried out in a standard polyethylene foam extruder having an annular die opening approximately 0.02 inches in width.

EXAMPLE 1

In this Example the polyethylene melt consisted of 100 parts of a polyethylene resin having a melt index of 3.0. The extruded foam had a density of 2.05 pounds per cubic foot when first extruded. It took 3 weeks of aging at ambient temperature and pressure conditions for the foam to stabilize in density. It stabilized at 2.2 pounds per cubic foot after the 3 week aging period.

EXAMPLE 2

In this Example the polyethylene melt consisted of 100 parts of a polyethylene resin having a melt index of 0.4. The extruded foam sheet had a density of 2.15 pounds per cubic foot. The extruded sheet took 2 weeks of aging at ambient temperatures and pressures to stabilize in density and after the 2 weeks aging period, it stabilized at 2.30 pounds per cubic foot.

EXAMPLE 3

In this Example the polyethylene melt consisted of a blend of 50 parts of the resin of Example 1 and 50 parts of the resin of Example 2. The extruded sheet had a density of 2.05 pounds per cubic foot. The foam was aged at ambient temperatures and pressures. After only a 6 day aging period, the density of the foam had stabilized. The stabilized foam density was 2.2 pounds per cubic foot.

EXAMPLE 4

Example 3 is repeated except that 85 parts by weight of the blend of Example 3 are admixed with 15 parts by weight high density polyethylene resin having a density of about 0.940. Favorable results are obtained in terms of reduced aging time.

EXAMPLE 5

Example 4 is repeated except that a low density polyethylene resin having a density of about 0.916 and having a melt index, of about 0.6 is employed in place of the high density polyethylene. Favorable results are obtained in terms of reduced aging time.

EXAMPLE 6

Example 4 is repeated except that polyethylene resin is employed in place of the high density polyethylene. Favorable results are obtained in terms of reduced aging time.

EXAMPLE 7

Example 4 is repeated except that low density polyethylene resin having a melt index of about 60 is employed in the place of the high density polyethylene. Favorable results are obtained in terms of reduced aging time.

EXAMPLE 8

Example 4 is repeated except that the blend of Example 3 is increased to 95 parts of the admixture and the high density polyethylene is reduced to 5 parts of the admixture. Favorable result are obtained in terms of reduced aging time.

EXAMPLE 9

In this Example the polyethylene melt consisted of a blend of 42 parts of the resin of Example 2 and 58 parts of a polyethylene resin having a melt index of 0.6. The extruded foam sheet had a density of 2.4 pounds per cubic foot. It took the foam 18 days of aging at ambient temperatures and pressures to stabilize in density. The stabilized density of the foam sheet was 2.55 pounds per cubic foot.

GENERAL EXAMPLES

A large number of tests have been conducted on single melt index materials of widely different values and a large number of tests have been conducted on blends of resins in accordance with the present invention. The shortest period for stabilization with single resins no matter what the melt index was 2 weeks, the average was 3 weeks and the stabilization period took up to 6 weeks. In contrast to this, all of the samples of blends in accordance with the present invention stabilized in a period of 1 week or less and most had stabilized after 5 to 6 days.

It will be understood that the claims are intended to cover all changes and modifications of the preferred embodiment of the invention, herein chosen for the purpose of illustration, which do not constitute departures from the spirit and scope of the invention.

What is claimed is:

1. In the process of forming polyethylene foam of density no greater than about 10 pounds per cubic foot by extrusion of a thermoplastic melt having a blowing agent incorporated therein and wherein foaming of the thermoplastic melt takes place immediately upon extrusion, the improvement comprising the thermoplastic melt being composed of:
   (a) at least 25% by weight of a polyethylene resin having a melt index in the range of from about 0.1 to about 1.0;
   (b) at least 25% by weight of a polyethylene resin having a melt index of from about 1.0 to about 10.0;
   (c) the melt index of the second said resin being at least about 1.0 greater than the melt index of the first said resin;
   (d) each said polyethylene resin (a) and (b) having a density of from about 0.910 to about 0.926;
   (e) at least about 85% by weight of the resin portion of the thermoplastic melt being low density polyethylene resin of density from about 0.910 to about 0.926;
   (f) the overall melt index of the thermoplastic melt being no greater than about 8.

2. The process of claim 1 wherein the thermoplastic melt consists of only the two polyethylene resins (a) and (b).

3. The process of claim 1 wherein the thermoplastic melt comprises at least three polyethylene resins.

4. The process of claim 1 wherein the melt index of the second said resin is at least about 2.0 greater than the melt index of the first said resin.

5. The process of claim 1 wherein the melt index of the second said resin is at least about 2.5 greater than the melt index of the first said resin.

6. The process of claim 1 wherein the said overall melt index is no greater than about 5.

7. The process of claim 1 wherein at least about 95% of the resin portion of the thermoplastic melt is low density polyethylene of density from about 0.910 to about 0.926.

8. The process of claim 1 wherein substantially all of the resin portion of the thermoplastic melt is low density polyethylene of density from about 0.910 to about 0.926.

9. The process of claim 1 wherein the density of the foam produced is from about 1 to about 6 pounds per cubic foot.

10. In the process of forming polyethylene foam having a density of from about 2 to about 4 pounds per cubic foot by extrusion of a thermoplastic melt having a blowing agent incorporated therein and wherein foaming of the thermoplastic melt takes place immediately upon extrusion, the improvement comprising the thermoplastic melt being composed of:
   (a) at least 25% by weight of a polyethylene resin having a melt index in the range of from about 0.1 to about 1.0;
   (b) at least 25% by weight of a polyethylene resin having a melt index of from about 1.0 to about 10.0;
   (c) the melt index of the second said resin being at least about 2.0 greater than the melt index of the first said resin;
   (d) each said polyethylene resin having a density of from about 0.910 to about 0.926;
   (e) substantially all of the resin in the thermoplastic melt being low density polyethylene of density from about 0.910 to about 0.926;
   (f) the overall melt index of the thermoplastic melt being no greater than about 5.

* * * * *